United States Patent
Momiyama et al.

(10) Patent No.: US 9,269,980 B2
(45) Date of Patent: Feb. 23, 2016

(54) SOLID OXIDE FUEL CELL

(75) Inventors: Yutaka Momiyama, Kitakyushu (JP);
Yasuo Kakinuma, Kitakyushu (JP);
Yuya Takahashi, Kitakyushu (JP);
Akira Ishiguro, Kitakyushu (JP);
Shigeru Ando, Kitakyushu (JP); Akira Kawakami, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 14/111,500

(22) PCT Filed: Apr. 10, 2012

(86) PCT No.: PCT/JP2012/059798
§ 371 (c)(1),
(2), (4) Date: Nov. 25, 2013

(87) PCT Pub. No.: WO2012/141177
PCT Pub. Date: Oct. 18, 2012

(65) Prior Publication Data
US 2014/0087288 A1    Mar. 27, 2014

(30) Foreign Application Priority Data

Apr. 12, 2011  (JP) ................................ 2011-087867
Mar. 30, 2012  (JP) ................................ 2012-080128

(51) Int. Cl.
*H01M 8/10*   (2006.01)
*H01M 4/90*   (2006.01)
(Continued)

(52) U.S. Cl.
CPC .............. *H01M 8/1016* (2013.01); *H01B 1/08* (2013.01); *H01M 4/9025* (2013.01); *H01M 8/1246* (2013.01); H01M 2300/0074 (2013.01); Y02E 60/521 (2013.01); Y02E 60/525 (2013.01)

(58) Field of Classification Search
CPC ............ H01M 4/9025; H01M 8/1246; H01M 2300/0074
USPC .......... 429/490; 204/295, 252; 96/4; 427/586
See application file for complete search history.

(56) References Cited

U.S. PATENT DOCUMENTS

| 2002/0013214 A1 | 1/2002 | Kuroda et al. |
| 2007/0009784 A1 | 1/2007 | Pal et al. |
| 2008/0075998 A1 | 3/2008 | Ishihara et al. |

(Continued)

FOREIGN PATENT DOCUMENTS

| JP | 2005-216760 A | 8/2005 |
| JP | 2005-310737 A | 11/2005 |

(Continued)

OTHER PUBLICATIONS

International Preliminary Report on Patentability and Translation of Written Opinion of the International Searching Authority; PCT/JP2012/059798 on Oct. 15, 2013.
Ishihara et al.; "Recent progress in LaGaO3 based solid electrolyte for intermediate temperature SOFCs"; Solid State Ionics, Oct. 15, 2006; pp. 1949-1953; vol. 177; Elsevier; North Holland, NL.
M.Rozumek met al.; "Homogeneity Region of Strontium- and Magnesium-Containg LaGaO3 at Temperatures between 1100° abd 1500° C in Air"; Journal of the American Ceramic Society; Nov. 2003; pp. 1940-1946; vol. 86; No. 11.

(Continued)

*Primary Examiner* — Cynthia H Kelly
*Assistant Examiner* — Monique Wills
(74) *Attorney, Agent, or Firm* — Studebaker & Brackett PC

(57) ABSTRACT

A solid oxide fuel cell scatters MgO over a grain boundary of an LSGM which is a solid electrolyte layer. Ni components that diffuse from a fuel electrode formed on the other side of an LDC from the LSGM are trapped by the scattered MgO particles and are suppressed from diffusing towards an air electrode in the electrolyte layer.

6 Claims, 7 Drawing Sheets

(51) Int. Cl.
*H01M 8/12* (2006.01)
*H01B 1/08* (2006.01)

(56) References Cited

U.S. PATENT DOCUMENTS

2009/0148743 A1* 6/2009 Day et al. .................. 429/33
2009/0181274 A1   7/2009 Elangovan et al.
2011/0111323 A1* 5/2011 Ishihara et al. ............ 429/490

FOREIGN PATENT DOCUMENTS

JP 2006-040762 A 2/2006
JP 2006-286403 A 10/2006

OTHER PUBLICATIONS

A. Jakobsson et al.; "Thermodynamic Study of the NiO—MgO System in the Temperature Range 1073 to 1473 K by a Galvanic Cell Technique"; Metallurgical Transactions B; Dec. 1993; pp. 1023-1030; vol. 24B.
An Office Action; "Notice of Reasons for Rejection," issued by the Japanese Patent Office on Oct. 21, 2015, which corresponds to Japanese Patent Application No. 2012-080128 and is related to U.S. Appl. No. 14/111,500; with English language partial translation.
Katsuhiko Yamaji; "Study on materials for solid oxide fuel cells"; [online]Thesis; Jul. 2015; pp. 96, 98, 105 and 118-119; Japan. [searched on Oct. 13, 2015]; with English language partial translation.

* cited by examiner

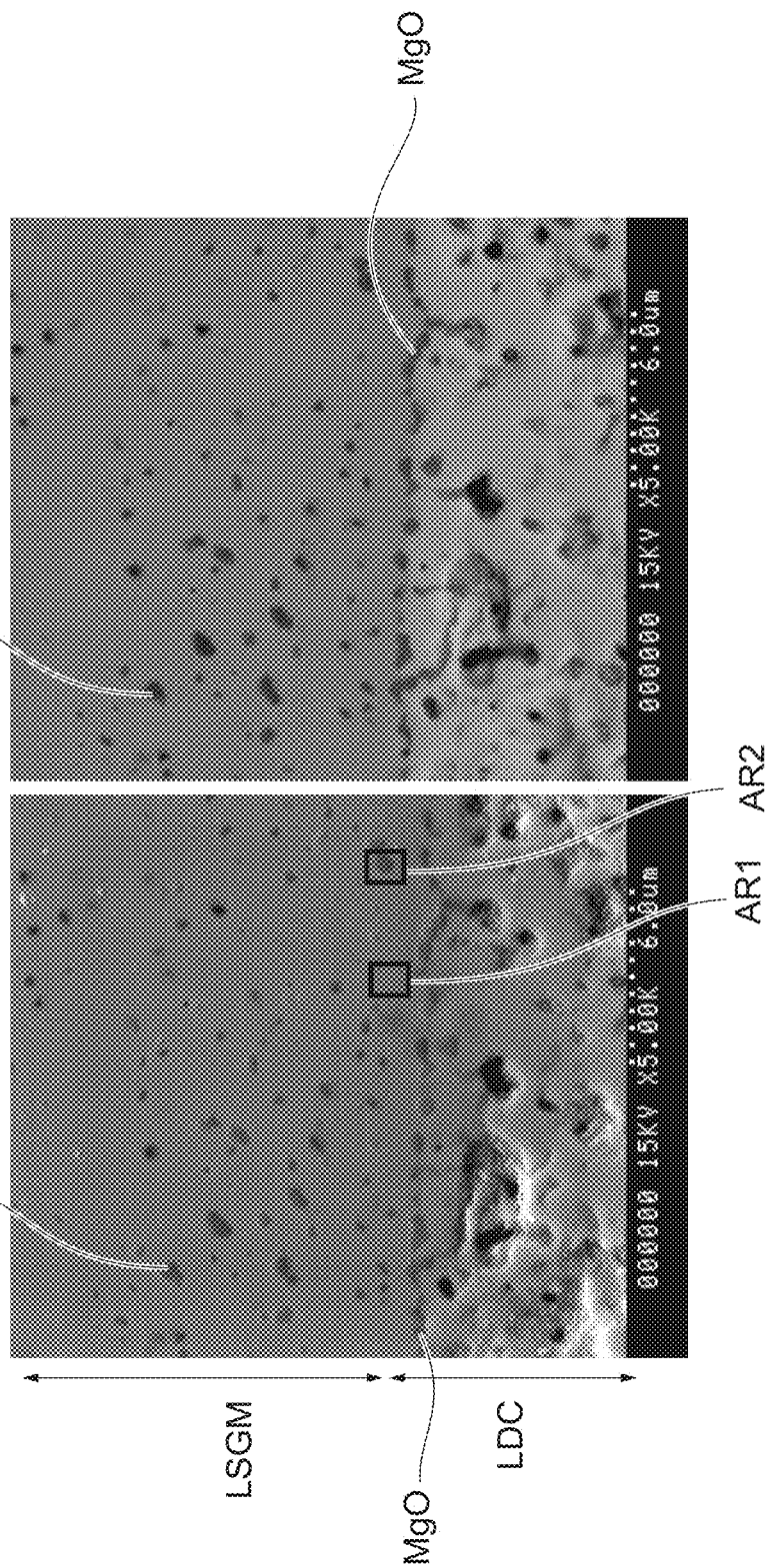

SOLID OXIDE FUEL CELL

TECHNICAL FIELD

The present invention relates to a solid oxide fuel cell.

BACKGROUND ART

Various materials are presented to be used as a solid electrolyte in a solid oxide fuel cell comprising: a solid electrolyte layer that is formed in a layer; a fuel electrode that is formed on a first side of the solid electrolyte layer wherein a fuel gas flows through the fuel electrode to reach the solid electrolyte layer; and an air electrode that is formed on a second side of the solid electrolyte layer wherein an oxidant gas flows through the air electrode to reach the solid electrolyte layer.

In such background, recently, a perovskite-type composite oxide (hereinafter also referred to as "lanthanum gallate oxide") comprising at least La and Ga has been focused on as a substance that obtains higher oxygen ion conductivity than that of a stabilized zirconia, and a lot of research is being conducted. Lanthanum gallate oxide is a substance in which the decrease in oxygen ion conductivity is small, even at low temperature, and in which part of the La or Ga is replaced with Sr, Mg or the like, which has a lower valence than that of La or Ga, through a substitutional solid solution, resulting in that a sintered body has a property of a large oxygen ion conductivity. As described above, the lanthanum-gallate-based electrolyte using the lanthanum gallate oxide as the solid electrolyte is presented as an example in patent document 1 mentioned below.

PRIOR ART DOCUMENT

Patent Document

Patent Document 1: JP2008-077998 A

SUMMARY OF THE INVENTION

Problem to be Solved by the Invention

Lanthanum-gallate-based electrolytes have a higher ion conductivity at low temperature than that of stabilized zirconia electrolytes and are able to contribute to improvements in power generation performance at low temperature. However, lanthanum-gallate-based electrolytes have a higher reactivity with Ni components included in a fuel electrode than that of stabilized-zirconia-based electrolytes and the Ni components easily diffuse into the lanthanum-gallate-based electrolytes during cell production or operation. There was a problem to be solved in that when the Ni components diffuse into the Lanthanum-gallate-based electrolytes, the ion transport number of an electrolyte decreases, causing an electrical internal short circuit between the fuel electrode and the air electrode, resulting in the decrease in output of a fuel cell.

In order to solve this problem, in Patent Document 1 mentioned above, a layer made of cerium-containing oxide is provided between an electrolyte layer made of lanthanum-gallate-based electrolytes and a fuel electrode. The layer made of cerium-containing oxide as described above is formed for the purpose of serving as a reaction preventing layer that suppresses the Ni components included in the fuel electrode from diffusing into the lanthanum-gallate-based electrolytes. However, the diffusion of the Ni components cannot be completely prevented by only the reaction preventing layer comprising a cerium-containing oxide, and a further solution is needed for improving the output performance.

The present invention has been made in view of the above problems, and has an object of providing a solid oxide fuel cell that improves the effect of suppressing diffusion of Ni components included in a fuel electrode into a fuel electrode.

Means for Solving the Problem

In order to solve the above problems, the solid oxide fuel cell according to the present invention comprises a solid electrolyte layer that is formed in a layer; a fuel electrode that is formed on a first side of the solid electrolyte layer wherein a fuel gas flows through the fuel electrode to reach the solid electrolyte layer; and an air electrode that is formed on a second side of the solid electrolyte layer wherein an oxidant gas flows through the air electrode to reach the solid electrolyte layer, wherein the fuel electrode comprises at least one of Ni and NiO, wherein the solid electrolyte layer comprises a perovskite-type composite oxide including at least La and Ga, and MgO, and wherein in the solid electrolyte layer MgO as a particulate MgO particle is spotted at a grain boundary of particles made of the perovskite-type composite oxide as a main component.

The grain boundary of particles made of the perovskite-type composite oxide as a main component used here comprises an interface between the particles of the perovskite-type composite oxide obtained through sintering and a triple point of the grain boundary.

The Ni components that diffuse into the solid electrolyte layer from the fuel electrode side diffuse towards the air electrode through the solid electrolyte by moving through the grain boundary of the perovskite-type composite oxide in the solid electrolyte. In the present invention, in the solid electrolyte layer the MgO as a particulate MgO particle is spotted at the grain boundary of particles made of the perovskite-type composite oxide as the main component. Thus, the Ni components diffused from the fuel electrode would pass through the area in which the MgO particles are spotted. The present inventors have found out that the MgO particle has a function of trapping the Ni components, and the present invention utilizes such knowledge. Therefore, the Ni components that enters the area in which the MgO particles are spotted is trapped by the MgO particle in such spotted area, and it is ensured that a further diffusion into the area of the air electrode side in the solid electrolyte layer is suppressed. Therefore, the prevention of a decrease in power generation performance due to an electrical internal short circuit between the fuel electrode and the air electrode can be ensured.

In the present invention, the MgO particles are spotted at the grain boundary of particles made of a perovskite-type composite oxide as the main component in the solid electrolyte layer. Due to such spotting of MgO particles, a decrease in ion conductivity caused by the MgO particles can be suppressed. Furthermore, fewer MgO particles can exert a maximum effect of preventing diffusion of Ni components with the particles spotted in the most effective area for preventing of Ni components.

The MgO particle used here is an oxide particle having magnesium (Mg) and oxygen (O) as the main components thereof. That is, the MgO particle may include elemental components other than Mg and O in some degree. For example, this includes the case where, in the firing step during cell production, Ni components included in the fuel electrode diffused into the solid electrolyte layer and the MgO particles which are spotted over the solid electrolyte layer had already trapped the Ni components, thereby resulting in a particle having an Mg component, an Ni component and oxygen as the main components thereof.

In the solid oxide fuel cell according to the present invention, the MgO particle is included in the solid electrolyte layer, preferably at a rate larger than 0 vol % and equal to or smaller than 20 vol %, and more preferably at a rate larger than 0 vol % and equal to or smaller than 15 vol %.

In the preferred embodiment, the amount of MgO particles included in the solid electrolyte layer having a rate larger than 0 vol % and equal to or smaller than 20 vol % enables the exertion of a maximum effect of preventing diffusion of the Ni components by the MgO particles while achieving the least decrease in ion conductivity by the MgO particles. Moreover, the amount of MgO particles having a rate equal to or smaller than 15 vol % enables a more effective minimum suppression of the least decrease in ion conductivity.

In the solid oxide fuel cell according to the present invention, the average particle diameter of a MgO particle is, preferably, 0.01 to 2.0 μm and more preferably, 0.1 to 1.0 μm.

In the preferred embodiment, the average particle diameter of a MgO particle included in the solid electrolyte layer being 0.01 to 2.0 μm enables the exertion of a maximum effect of MgO particles preventing diffusion of Ni components while achieving the least decrease in ion conductivity by the MgO particles. Moreover, the average particle diameter of the MgO particle being the more preferable 0.1 to 1.0 μm enables a more effective exertion of a maximum effect of MgO particles preventing diffusion of Ni components while achieving the least decrease in ion conductivity by the MgO particles.

Some of the MgO particles may exist within the particles of the perovskite-type composite oxide. However, in order to exert a maximum effect of preventing diffusion of Ni components with fewer MgO particles, there are, preferably, as few MgO particles existing in the particles as possible. Therefore, in the present invention, it is preferable to spot the majority of the MgO particles at the grain boundary, and ideally, it is preferable that the MgO particles do not exist in the particles of the perovskite-type composite oxide.

In the solid oxide fuel cell according to the present invention, preferably, the MgO is a particulate MgO particle and is unevenly distributed at the one side of the solid electrolyte layer.

Due to such uneven distribution of MgO particles, a decrease in ion conductivity caused by the MgO particles could be suppressed. Furthermore, fewer MgO particles can exert a maximum effect of preventing diffusion of Ni components with the MgO particles spotted in the most effective area for preventing diffusion of Ni components.

Moreover, in the solid oxide fuel cell according to the present invention, preferably, at an interface of the fuel electrode side of the solid electrolyte layer, a volume ratio of the particle having the perovskite-type composite oxide as the main component to the MgO particle is 80:20 to 20:80.

In the preferred embodiment, the volume ratio of the LSGM particle to the MgO particle being 80:20 to 20:80 enables the exertion of a maximum effect of MgO particles preventing Ni diffusion by the MgO particles while achieving the least decrease in ion conductivity by the MgO particles.

The solid oxide fuel cell according to the present invention, preferably comprises an intermediate layer, made of a cerium oxide that includes La, between the solid electrolyte layer and the fuel electrode.

In the preferred embodiment, comprising an intermediate layer, made of a cerium oxide that includes La, between the solid electrolyte layer and the fuel electrode, enables the suppression of diffusion of the La included in the perovskite-type composite oxide of the solid electrolyte layer into the fuel electrode, thereby allowing the perovskite-type composite oxide particles and the MgO particles to be stably present. Therefore, it is ensured that the stably present MgO particles can trap the Ni diffusing towards the solid electrolyte layer.

Effect of the Invention

The present invention can provide a solid oxide fuel cell with an improved effect of suppressing diffusion of Ni components included in a fuel electrode into an electrolyte layer.

BRIEF DESCRIPTION OF THE DRAWINGS

FIG. 5 is a view showing a state of a surface of a solid electrolyte of a single cell obtained as an example.

MODE FOR CARRYING OUT THE INVENTION

Figure 1:
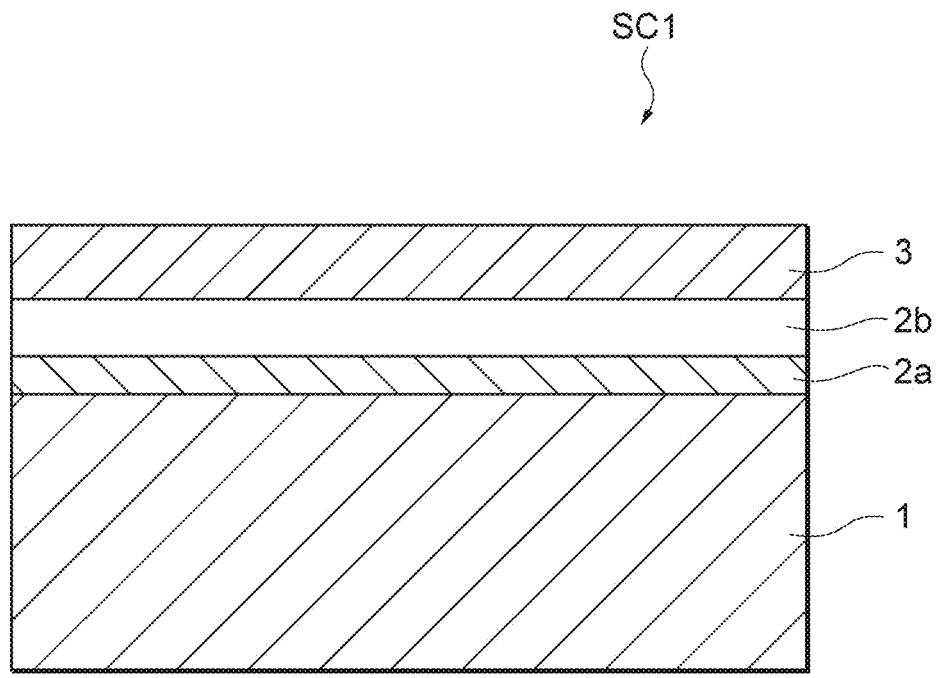
FIG. 1 is a schematic cross-sectional view showing a cross-section of a single cell of a solid oxide fuel cell according to an embodiment.

Embodiments of the present invention will be described below with reference to the accompanying drawings. To facilitate understanding of the description, the same components in different drawings are denoted by the same reference numerals whenever possible and repetitive descriptions thereof will be omitted.

A solid oxide fuel cell, which is an embodiment of the present invention, will be described with reference to FIG. 1. FIG. 1 is a schematic cross-sectional view showing the cross-section of a single cell of a solid oxide fuel cell according to an embodiment of the present invention. A single cell SC1 shown in FIG. 1 comprises a fuel electrode support 1 (fuel electrode), a solid electrolyte layer 2b and an air electrode 3. An intermediate layer 2a is provided between the fuel electrode support 1 and the solid electrolyte layer 2b.

The fuel electrode support 1 is configured, for example, as a complex of Ni and/or NiO and a $Y_2O_3$-doped zirconium-containing oxide.

The intermediate layer 2a is a layer formed on a surface of the fuel electrode support 1. The intermediate layer 2a is constituted by a cerium-containing oxide represented by $Ce_{1-x}La_xO_2$ (wherein $0.30<x<0.50$), for example. The solid electrolyte layer 2b is a layer formed closer to the air electrode 3 than the intermediate layer 2a. The solid electrolyte layer 2b is constituted by a lanthanum gallate oxide.

In the present embodiment, MgO particles are spotted over the solid electrolyte layer 2b. More specifically, the MgO particles are spotted at the grain boundary of particles having a lanthanum gallate oxide as the main component thereof in the solid electrolyte layer 2b.

The air electrode 3 is a layer formed on a surface of the solid electrolyte layer 2b. The air electrode 3 is constituted, for example, by a lanthanum-cobalt-based oxide, a lanthanum-ferrite-based oxide or a samarium-cobalt-based oxide.

Figure 2:
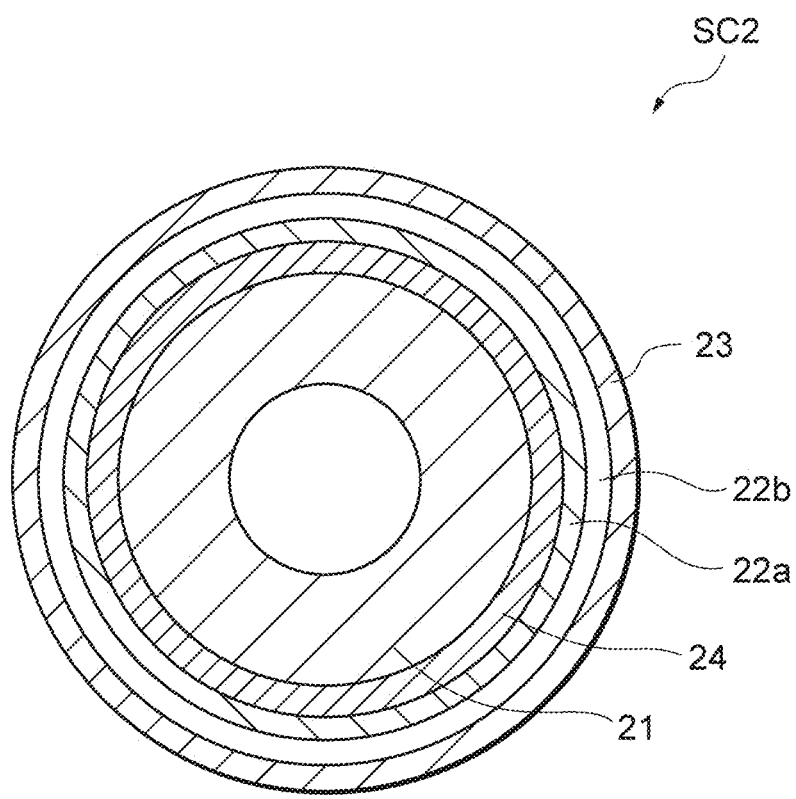
FIG. 2 is a schematic cross-sectional view showing a cross-section of a single cell of a solid oxide fuel cell according to an embodiment.

The single cell SC1 shown in FIG. 1 represents an example of an embodiment of the present invention. Various modifications may be employed as embodiments of the present invention. FIG. 2 shows a schematic cross-section of a cylindrically formed single cell SC2.

The single cell SC2 shown in FIG. 2 comprises a fuel electrode support 21 (fuel electrode), a fuel electrode reaction catalyst layer 24, a solid electrolyte layer 22b and an air electrode 23. An intermediate layer 22a is provided between the solid electrolyte layer 22b and the fuel electrode reaction catalyst layer 24.

The fuel electrode support 21 is configured, for example, as a complex of Ni and/or NiO and a $Y_2O_3$-doped zirconium-containing oxide. The fuel electrode support 21 is formed in a cylindrical shape. The fuel electrode reaction catalyst layer 24 is a layer formed on a surface of the fuel electrode support 21.

The intermediate layer 22a is a layer formed on a surface of the fuel electrode reaction catalyst layer 24. The intermediate layer 22a is constituted, for example, by a cerium-containing oxide represented by $Ce_{1-x}La_xO_2$ (wherein $0.30<x<0.50$). The solid electrolyte layer 22b is a layer formed closer to the air electrode 23 than the intermediate layer 22a. The solid electrolyte layer 22b is constituted by a lanthanum gallate oxide.

In the present embodiment, MgO particles are spotted at the solid electrolyte layer 22b. More specifically, the MgO particles are spotted at the grain boundary of particles having a lanthanum gallate oxide as the main component thereof in the solid electrolyte layer 22b.

The air electrode 23 is a layer formed on a surface of the solid electrolyte layer 22b. The air electrode 23 is constituted, for example, by a lanthanum-cobalt-based oxide, a lanthanum-ferrite-based oxide or a samarium-cobalt-based oxide The operating principle of a solid oxide fuel cell is as described below. When air flows at an air electrode side and a fuel gas (for example, gas including $H_2$ and/or CO) flows at a fuel electrode side, oxygen in the air changes to oxygen ions near the interface between the air electrode and the solid electrolyte layer, and these oxygen ions reach the fuel electrode through the solid electrolyte layer. Then, the fuel gas reacts with the oxygen ions and becomes water and carbon dioxide. These reactions are represented by formulae (1), (2) and (3), below. Electricity could be extracted outside by connecting the air electrode and the fuel electrode with an external circuit.

$$H_2 + O^{2-} \rightarrow H_2O + 2e^-  \quad (1)$$

$$CO + O^{2-} \rightarrow CO_2 + 2e^- \quad (2)$$

$$\tfrac{1}{2}O_2 + 2e^- \rightarrow O^{2-} \quad (3)$$

In light of the fact that the cerium-containing oxide forming intermediate layers 2a, 22a of the embodiment has a low reactivity with the solid electrolyte layers 2b, 22b made of a lanthanum gallate oxide and is capable of allowing the lanthanum gallate oxide particles and the MgO particles to be stably present, the cerium-containing oxide is, preferably, represented by a general formula of $Ce_{1-x}Ln_xO_2$ (wherein Ln is La, and $0.30<x<0.50$). The use of La as Ln most effectively prevents the cerium-containing oxide from reacting with the solid electrolyte layers 2b, 22b made of a lanthanum gallate oxide to be prevented most effectively, thereby improving the power generation performance. Moreover, the optimum Ln doping amount changes depending on the composition of the lanthanum gallate oxide used in the solid electrolyte layers 2b, 22b. Taking into account the use of a lanthanum gallate oxide having a composition of high oxygen ion conductivity in the solid electrolyte layers 2b, 22b (for example, a lanthanum gallate oxide represented by a general formula of $La_{1-a}Sr_aGa_{1-b-c}Mg_bCo_cO_3$ (wherein $0.05 \leq a \leq 0.3$, $0 \leq b \leq 0.3$, $0 \leq c \leq 0.15$) the Ln doping amount is, preferably, $0.35 \leq x \leq 0.45$.

A method for producing a powder made of a cerium-containing oxide is not particularly limited. General methods may include a mixed oxide method, a co-precipitation method, a citrate process, a spray pyrolysis method and a sol-gel process.

In the present embodiment, when the thickness of intermediate layers 2a, 22a made of a cerium-containing oxide is S μm, preferably, $1<S<50$, and more preferably, $3 \leq S \leq 20$.

This is because the intermediate layers 2a, 22a having a thickness of more than 1 μm can suppress the reaction between the fuel electrode supports 1, 21 and the solid electrolyte layers 2b, 22b. The intermediate layers 2a, 22a having a thickness of 3 μm or more further can suppress the reaction more reliably. On the other hand, the intermediate layers 2a, 22a having a thickness of less than 50 μm can suppress the influence of resistance loss in the intermediate layers 2a, 22a. The intermediate layers 2a, 22a having a thickness of 20 μm or less further can suppress the influence of resistance loss. Therefore, it is preferable to make preferably, the thickness of the intermediate layers 2a, 22a as thin as possible as far as the layers can sufficiently suppress a reaction between the fuel electrode supports 1, 21 and the solid electrolyte layers 2b, 22b.

In the present embodiment, when the thickness of the solid electrolyte layers 2b, 22b is T μm, the thickness is preferably, $2<T<70$, and more preferably, $10 \leq T \leq 50$.

This is because the solid electrolyte layers 2b, 22b having a thickness of more than 2 μm exhibits electron conductivity since the Ni component diffuses from the fuel electrode side to the solid electrolyte layer side to prevent an electrical internal short-circuit between the fuel electrode and the air electrode, thereby suppress the influence of a decrease in power generation performance. The solid electrolyte layers 2b, 22b having a thickness of 10 μm or more further can suppress the influence more reliably. On the other hand, the solid electrolyte layers 2b, 22b having a thickness of less than 70 μm can suppress the influence of resistance loss in the solid electrolyte layers 2b, 22b. The solid electrolyte layers 2b, 22b having a thickness of 50 μm or less further suppress a further decrease in the influence of resistance loss in the solid electrolyte layers 2b, 22b.

The lanthanum gallate oxide (perovskite-type composite oxide) in the solid electrolyte layers 2b, 22b of the embodiment is represented by $La_{1-a}A_aGa_{1-(b+c)}B_bC_cO_3$. (wherein A is one or two of Sr and Ca; B is one or two or more of Mg, Al and In; C is one or two or more of Mn, Fe and Co; and $0.05 \leq a \leq 0.3$, $0 \leq b \leq 0.3$, $0 \leq c \leq 0.15$.)

In light of the fact that the lanthanum gallate oxide (perovskite-type composite oxide) in the solid electrolyte layers 2b, 22b of the embodiment has high oxygen ion conductivity, the lanthanum gallate oxide represented by the following general formula is preferable: $La_{1-a}Sr_aGa_{1-b}Mg_bO_3$ (wherein $0.05 \leq a \leq 0.3$, $0 \leq b \leq 0.3$) (LSGM).

In light of the fact that the lanthanum gallate oxide (perovskite-type composite oxide) in the solid electrolyte layers 2b, 22b of the embodiment has high oxygen ion conductivity, the lanthanum gallate oxide represented by the following general formula is preferable: $La_{1-a}Sr_aGa_{1-b-c}Mg_bCo_cO_3$ (wherein $0.05 \leq a \leq 0.3$, $0 \leq b \leq 0.3$, $0 \leq c \leq 0.15$) (LSGMC).

The solid electrolyte layers 2b, 22b of the embodiment may have a configuration comprising both a layer made of LSGM and a layer made of LSGMC. In other words, the layers may have a multi-layer structure comprising a layer made of LSGM and a layer made of LSGMC.

A method for producing base powder made of lanthanum gallate oxide is not particularly limited. General methods may include a mixed oxide method, a co-precipitation method, a citrate process, a spray pyrolysis method and a sol-gel process.

Although not particularly limited, the fuel electrode supports 1, 21 of the present embodiment preferably have a high electron conductivity of the solid oxide fuel cell under a fuel atmosphere and the solid oxide fuel cell efficiently performs the reactions of formulas (1) and (2). In light of the above, preferable materials may include, for example, an NiO/zirconium-containing oxide, an NiO/cerium-containing oxide and an NiO/lanthanum gallate oxide. The NiO/zirconium-containing oxide, NiO/cerium-containing oxide and NiO/lanthanum gallate oxide indicated here refer to an NiO and zirconium-containing oxide, an NiO and cerium-containing oxide and an NiO and lanthanum gallate oxide which are homogeneously mixed with a predetermined ratio, respectively. The zirconium-containing oxide of the NiO/zirconium-containing oxide indicated here refers to a zirconium-containing oxide doped, for example, with one or more of CaO, $Y_2O_3$ or $Sc_2O_3$. The cerium-containing oxide of the NiO/cerium-containing oxide indicated here refers to a compound represented by the general formula, $Ce_{1-y}Ln_yO_2$ (wherein Ln is a combination of any one or more of La, Pr, Nd, Sm, Eu, Gd, Tb, Dy, Ho, Er, Tm, Yb, Lu, Sc and Y, and $0.05 \leq y \leq 0.50$). Since cerium-containing oxide, in general, is reduced under a fuel atmosphere and expresses electron conductivity, it becomes a mixed conductor. Although not particularly limited, the lanthanum gallate oxide of the NiO/lanthanum gallate oxide indicated here is preferably LSGM or LSGMC in order to perform the reactions of formulas (1) and (2) more efficiently. Since the NiO becomes Ni after being reduced under the fuel atmosphere, the mixture would be an Ni/zirconium-containing oxide, an Ni/cerium-containing oxide or an Ni/lanthanum gallate oxide.

A homogeneous mixing in this specification can be obtained by using base powder produced by a mixed oxide method, a co-precipitation method, a citrate process, a spray pyrolysis method or a sol-gel process. That is, the homogeneous mixing indicated here refers to there being sufficient homogeneity if there is a level of homogeneity at a raw material obtained by the above methods.

It is preferable to use the NiO/zirconium-containing oxide as a material of a fuel electrode when the fuel electrode as a support are fuel electrode supports 1, 21, in light of its excellence in strength and high stability as a support. In this case, it is preferable to provide a fuel electrode reaction catalyst layer 24 between the fuel electrode supports 1, 21 and the solid electrolyte layers 2b, 22b, in light of the fact that the reactions of formulas (1) and (2) can be performed more efficiently, thereby improving the power generation performance. The fuel electrode reaction catalyst layer 24 may include, for example, an NiO/cerium-containing oxide, an NiO/lanthanum gallate oxide, etc., in light of their excellence in electron conductivity and oxygen ion conductivity, and the weight ratio thereof is, preferably, 10/90-90/10. This is because the electron conductivity is too low when the NiO is less than 10/90 and the oxygen ion conductivity is too low when the NiO is more than 90/10. The fuel electrode reaction catalyst layer 24 may have a tilted structure such that the amount of NiO would gradually increase from the solid electrolyte layers 2, 22 towards the fuel electrode supports 1, 21.

The fuel electrode supports 1, 21 and the fuel electrode reaction catalyst layer 24 of the present embodiment may, in addition to Ni, include Fe, Co, Cu, Ru, Rh, Pd, Pt, etc.

Although not particularly limited, the air electrodes 3, 23 of the present embodiment preferably use a lanthanum-manganese-based oxide, a lanthanum-ferrite-based oxide, a lanthanum-cobalt-based oxide, a lanthanum-nickel-based oxide or a samarium-cobalt-based oxide.

A method for producing base powder for use in the fuel electrode supports 1, 21 and air electrodes 3, 23 of the present embodiment is not particularly limited. General methods may include a mixed oxide method, a co-precipitation method, a citrate process, a spray pyrolysis method and a sol-gel process.

A method for producing single cells SC1, SC2 of the present embodiment is preferably, for example, a method for producing cells, comprising the steps of: producing a compact of fuel electrode supports 1, 21 and pre-firing at 800° C.-1150° C.; molding solid electrolyte layers 2,22 on a surface of the obtained pre-fired body and co-sintering with a support at 1200° C.-1400° C.; and molding the other electrodes, i.e. air electrodes 3,23, on a surface of the sintered solid electrolyte layers 2,22 and sintering at 800° C.-1200° C. In terms of suppressing the diffusion of metal components from the support and in terms of obtaining a solid electrolyte layer with no gas permeability, the sintering temperature during co-firing of the support and the electrolyte is, preferably, 1250° C.-1350° C.

The method for producing the solid electrolyte layers 2,22 of the present embodiment is not particularly limited and may use a slurry coating method, a tape casting method, a doctor blade casting method, a screen printing method, an EVD method, a CVD method or an RF sputtering method. However, in terms of excellence in mass productivity and low cost, the slurry coating method is preferable.

The shape of a solid oxide fuel cell (single cell) of the present embodiment is not particularly limited and may be any one of a planar type, tubular type or flat tube type. In the tubular type case, the fuel cell may also be applicable to a microtube type (outside diameter: 10 mm or less, more preferably, 5 mm or less). The effect of the embodiment is that an excellent power generation performance can be obtained, particularly at an operating temperature of about 500° C.-800° C. It is preferable to be able to start operation of the solid oxide fuel cell at a low temperature. In terms of reliability and stability regarding a quick start and a quick stop, the shape of the solid oxide fuel cell (single cell) is, preferably, tubular type.

Example 1

(1) Production of LSGM Base Powder

The production of LSGM base powder was prepared by a solid phase method. Powders of various kinds of metal oxides which were to be the base were weighed so as to have a composition ratio of a perovskite-type oxide comprising lanthanum and gallium represented by $La_{0.9}Sr_{0.1}Ga_{0.8}Mg_{0.2}O_3$. After being mixed in a solution, the powder obtained after removing the solvent was fired at 1400° C. and ground to produce a lanthanum-gallate-based electrolyte material. Furthermore, the obtained powder was pre-fired at 1000° C. and ground to produce LSGM base powder.

(2) Production of Solid Oxide Fuel Cell (Single Cell)

The LSGM base powder obtained as described above was used to produce a single cell SC2, which is a solid oxide fuel cell, by the following method.

NiO and 1 OYSZ (10 mol % $Y_2O_3$-90 mol % $ZrO_2$) were mixed by a weight ratio of 65:35, molded into a cylindrical shape and pre-fired at 900° C. to produce a fuel electrode support 21. A mixture of NiO and GDC10 (10 mol % $Gd_2O_3$-90 mol % $CeO_2$) with a weight ratio of 50:50 was deposited on the fuel electrode support 21 by a slurry coating method to form a fuel electrode reaction catalyst layer 24. Furthermore, LDC (40 mol % $La_2O_3$-60 mol % $CeO_2$) and LSGM base powder were sequentially laminated on the fuel electrode reaction catalyst layer 24 by a slurry coating method to form the solid electrolyte layers 2b, 22b. The obtained compact was fired at 1300° C. Then, the air electrode 23 with a composition of $La_{0.8}Sr_{0.4}Co_{0.2}Fe_{0.8}O_3$ (LSCF) was deposited on the obtained fired body by a slurry coating method and fired at 1050° C. to produce a single cell SC2 which is a solid oxide fuel cell.

Regarding the produced single cell SC2, the fuel electrode support 21 has an outside diameter of 10 mm and a thickness of 1 mm, the fuel electrode reaction catalyst layer 24 has a thickness of 20 μm, the intermediate layer 22a which is the LDC layer has a thickness of 10 μm, the solid electrolyte layer 22b which is the LSGM layer has a thickness of 30 μm, and the air electrode 23 which is the LSCF layer has a thickness of 20 μm.

(3) Evaluation of Solid Oxide Fuel Cell (Single Cell)

The existence state of MgO in the solid electrolyte layer 22b of the single cell SC2, being the solid oxide fuel cell obtained above, was analyzed by the following method.

Figure 3A:
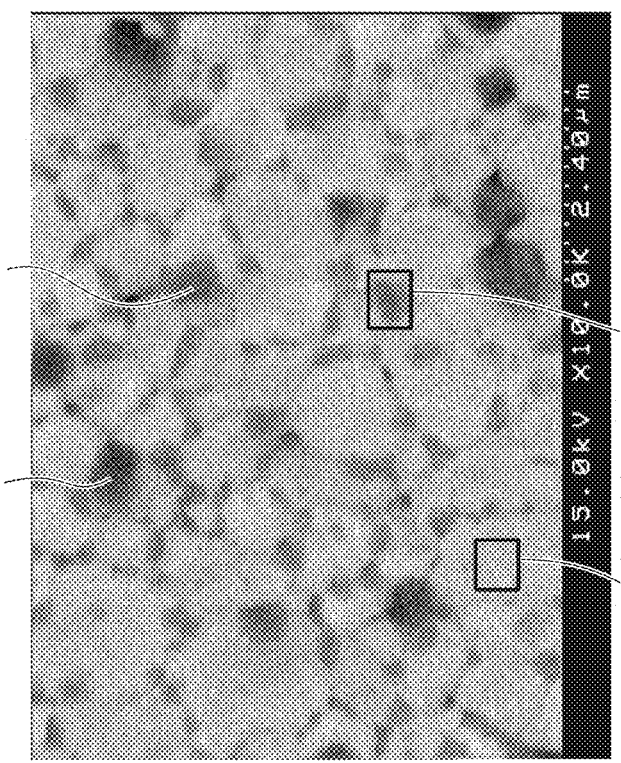
FIG. 3 is a view showing a state of a cross-section of a solid electrolyte of a single cell obtained as an example.

Firstly, the obtained single cell SC2 was cut and the cut surface was polished. Then, two hours of thermal etching was performed at 1250° C. and the cut surface was observed by an SEM-EDX (S4100: manufactured by Hitachi, Ltd.). The state of this cut surface is shown in FIG. 3. (A) is a secondary electron image and (B) is a backscattered electron image in the same field of view. As shown in FIG. 3, MgO particles are spotted at the grain boundary of the LSGM (solid electrolyte layer 22b) particles. The distribution of lanthanum gallate oxide particles and MgO particles was image-analyzed from the field of view of an SEM backscattered electron image 10 at 10.000-fold to determine the volume fraction of MgO particles from the proportional area of the MgO particles. As a result, the volume fraction of the MgO particles was 15 vol %. Furthermore, the maximum particle diameter of the MgO particles was 0.8 μm, their minimum particle diameter was 0.05 μm and their average particle diameter was 0.4 μm.

Figure 4B:
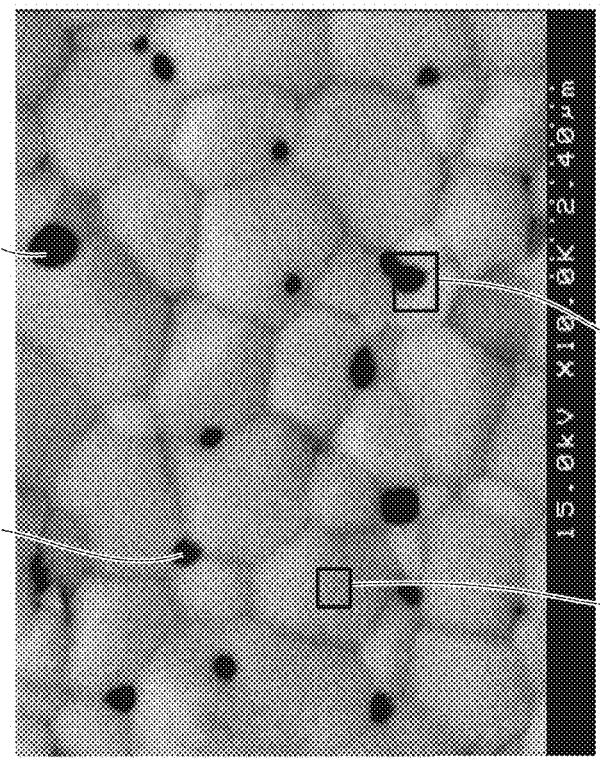
FIG. 4 is a view showing a state of a surface of a solid electrolyte of a single cell obtained as an example.
Figure 4A:
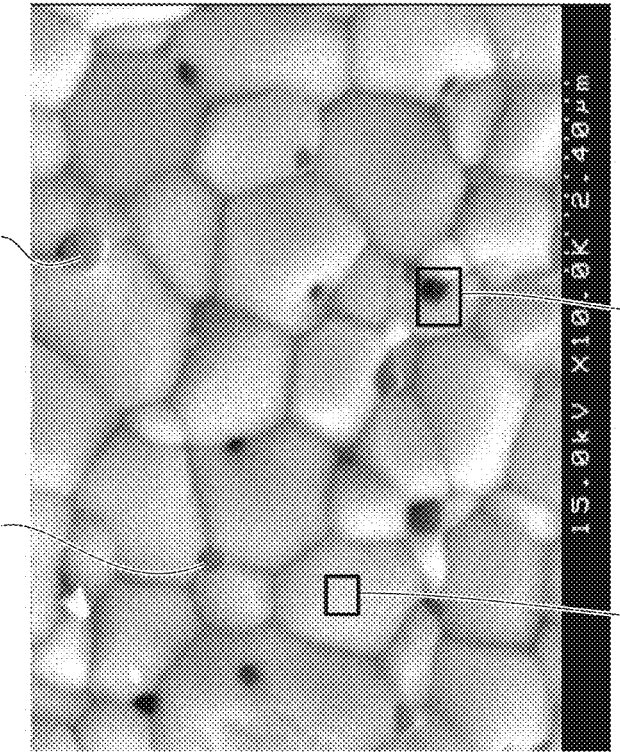

For the single cell SC2 in which the air electrode 23 was not deposited, the surface of the solid electrolyte layer 22b was observed by an SEM-EDX (S4100: manufactured by Hitachi, Ltd.). The state of this surface is shown in FIG. 4. (A) is a secondary electronic image and (B) is a backscattered electron image in the same field of view. As shown in FIG. 4, MgO particles are spotted at the grain boundary of the LSGM (solid electrolyte layer 22b) particles. The distribution of lanthanum gallate oxide particles and MgO particles was image-analyzed from the field of view of an SEM backscattered electron image 10 at 10,000-fold to determine the volume fraction of MgO particles from the proportional area of the MgO particles. As a result, the volume fraction of the MgO particles was 4 vol %. Furthermore, the maximum particle diameter of the MgO particles was 0.6 μm, the minimum particle diameter was 0.02 μm and the average particle diameter was 0.3 μm.

As shown in FIGS. 3 and 4, it can be recognized from the observation of the cross-section and the surface of the solid electrolyte layer that the MgO particles were spotted at the grain boundary of the LSGM (solid electrolyte layer 22b) particles.

Furthermore, the obtained single cell SC2 was cut and the cut surface was polished. Then, the cut surface was observed by an SEM-EDX (S4100: manufactured by Hitachi, Ltd.). This cut surface is shown in FIG. 5. (A) in FIG. 5 represents a secondary electron image and (B) in FIG. 5 represents a backscattered electron image. As shown in FIGS. 5 (A) and (B), MgO particles are unevenly distributed near the interface between the LSGM (solid electrolyte layer 22b) and the LDC (intermediate layer 22a). Although there are also MgO particles in the LSGM distant from the interface, there are more MgO particles at the LSGM unevenly distributed near the interface. In this area, MgO particles form a line along the interface between the LSGM and the LDC. This allows the Ni that diffuses from the LDC (intermediate layer 22a) and the fuel electrode support 21 to be trapped.

Figure 3B:
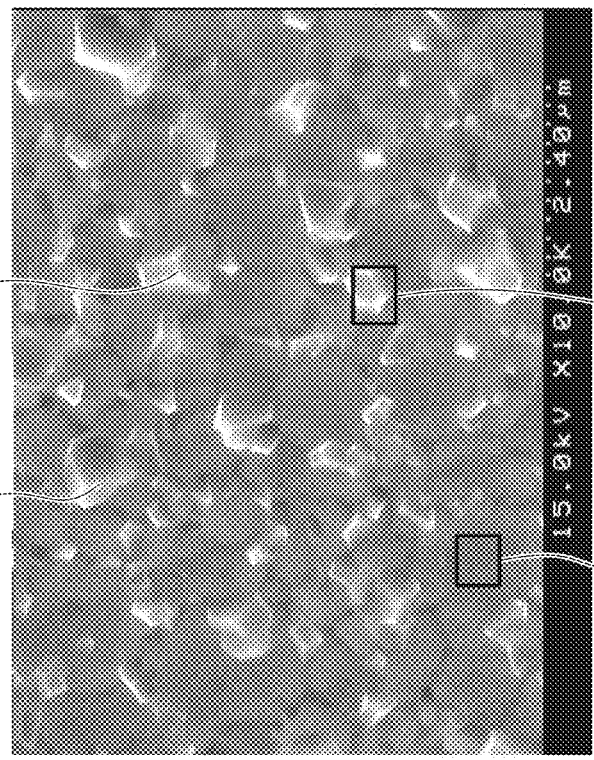
Figure 6:
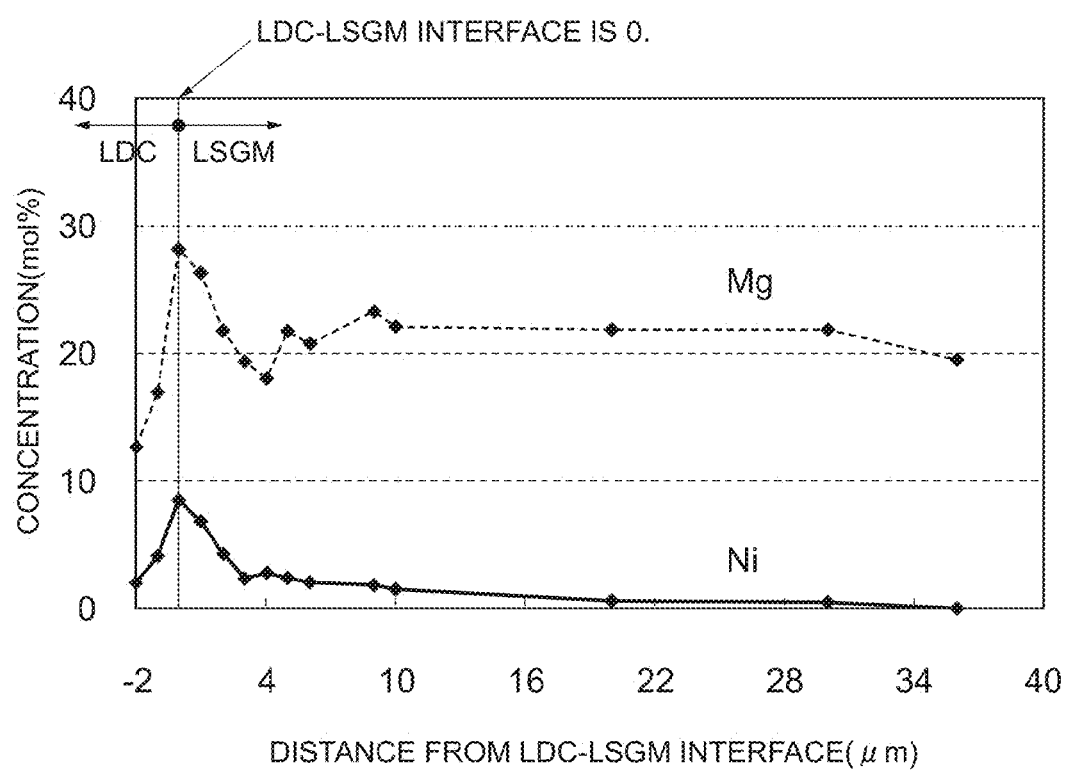
FIG. 6 is a view showing an existence state of Mg and Ni of a single cell obtained as an example.

Then, in order to make sure the state of the Ni component trapped by the MgO particles, the Ni component diffusion state in the LSGM layer was measured by the semi-quantitative amount through EDX. The results are shown in FIG. 6. In FIG. 6, the analytical range per dot is 10 μm in a direction along the interface and 2 μm in a direction perpendicular to the interface. A backscattered electron image at 5,000-fold magnification as shown in FIG. 3(B) was photographed and the area ratio of MgO particles (black particles of FIG. 3) are present in the analytical range per dot from the interface between the LSGM (solid electrolyte layer 22b) and the LDC (intermediate layer 22a) towards the LSGM (solid electrolyte layer 22b) was determined. In the graph shown in FIG. 6, the interface between the LSGM (solid electrolyte layer 22b) and the LDC (intermediate layer 22a) is the reference position and the distance from this reference position is represented by the horizontal axis. As shown in FIG. 6, it could be seen that there was a correlation in concentration between the Mg component and the Ni component.

Figure 7:
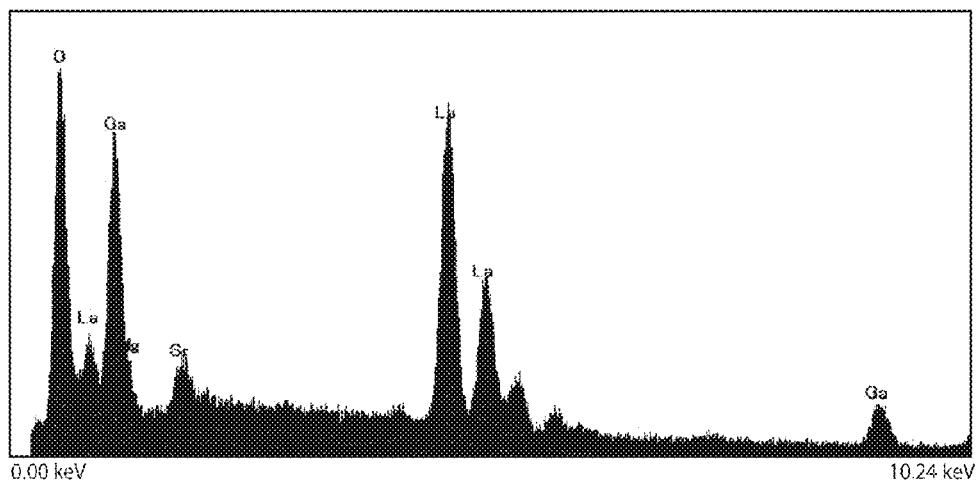
FIG. 7 is a graph showing an element distribution in a first area of FIG. 3.
Figure 8:
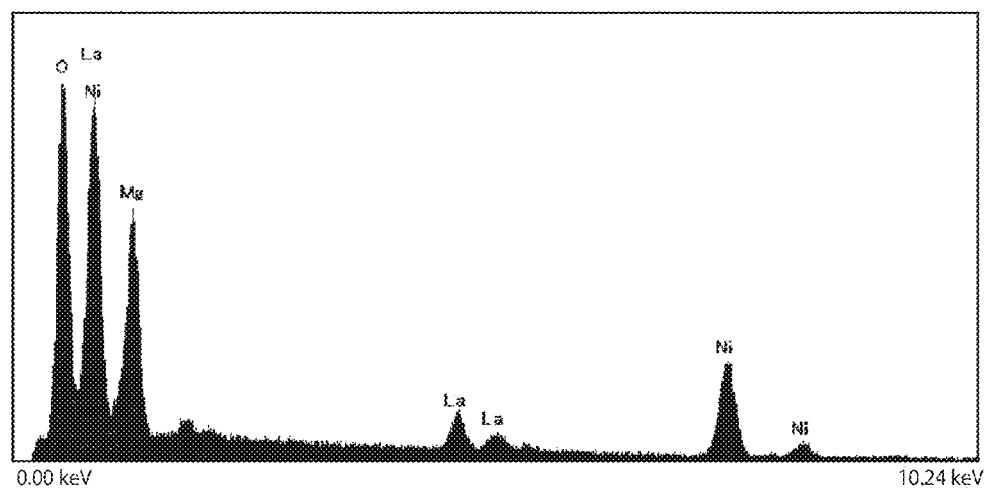
FIG. 8 is a graph showing an element distribution in a second area of FIG. 3.

Next, FIG. 7 shows a component distribution in a first area AR1 shown in FIG. 3. FIG. 8 shows a component distribution in a second area AR2 shown in FIG. 3. The first area AR1 is recognized as a light-colored area in FIG. 3 where there are fewer MgO particles and it is presumed that this is a particle having the lanthanum gallate oxide as the main component thereof. As shown in FIG. 7, in the first area AR1, the peak showing the presence of the Mg component is low, and this proves that such presumption is reasonable. Furthermore, in the first area AR1, the peak representing the Ni component is hardly detected. On the other hand, the second area AR2 is recognized as a dark-colored area in FIG. 3 where it is presumed that there are many MgO particles. As shown in FIG. 8, in the second area AR2, the peak representing the presence of the Mg component is high and this proves that such presumption is valid. Furthermore, in the second area AR2, the peak of the Ni component is high and it can be seen that the Ni component is trapped by the MgO particles.

It can be seen from the above that the MgO particles spotted at the grain boundary of the lanthanum gallate oxide particle trap the Ni component that diffuses from the fuel electrode into the solid electrolyte layer to effectively suppress the diffusion of the Ni component into the solid electrolyte layer towards the air electrode side. This prevents power generation performance from deteriorating due to an electrical internal short circuit between the fuel electrode and the air electrode is prevented, and resulting in achieving a high power generation performance to be obtained. The particle diameter of the MgO particle is, preferably, 0.01 to 2.0 μm, and more preferably, 0.1 to 1.0 μm. The volume rate of MgO particles in the solid electrolyte layer is, preferably, more than 0 vol % and 20 vol % or less, and more preferably, more than 0 vol % and 15 vol % or less. Adjusting in such manner enables a maximum exertion of the effect of the MgO particles preventing Ni diffusion while achieving the least decrease in ion conductivity by the MgO particles.

Embodiments of the present invention have been described above with reference to specific examples. However, the present invention is not limited to these examples. That is, when those skilled in the art make design changes to any of the examples, the resulting variations are also included in the scope of the present invention as long as the variations contain the features of the present invention. For example, the components of the above-described examples as well as the arrangements, materials, conditions, shapes, sizes, and the like of the components are not limited to those illustrated above, and may be changed as required. Moreover, the components of the above-described embodiments may be combined as long as it is technically possible, and the resulting combinations are also included in the scope of the present invention as long as the combinations contain the features of the present invention.

DESCRIPTION OF REFERENCE NUMERALS

1: Fuel electrode support
2a: Intermediate layer
2b: Solid electrolyte layer
3: Air electrode
21: Fuel electrode support
22a: Intermediate layer
22b: Solid electrolyte layer
23: Air electrode
24: Fuel electrode reaction catalyst layer
SC1: Single cell
SC2: Single cell

What is claimed is:

1. A solid oxide fuel cell comprising:
   a solid electrolyte layer that is formed in a layer;
   a fuel electrode that is formed on a first side of the solid electrolyte layer wherein a fuel gas flows through the fuel electrode to reach the solid electrolyte layer; and
   an air electrode that is formed on a second side of the solid electrolyte layer wherein an oxidant gas flows through the air electrode to reach the solid electrolyte layer,
   wherein the fuel electrode comprises at least one of Ni and NiO,
   wherein the solid electrolyte layer comprises a lanthanum gallate oxide represented by a general formula of $La_{1-a}Sr_aGa_{1-b}Mg_bO_3$ (wherein $0.05 \leq a \leq 0.3$, $0 \leq b \leq 0.3$) and MgO, and
   wherein in the solid electrolyte layer MgO as a particulate MgO particle is spotted at a grain boundary of particles made of the lanthanum gallate oxide as a main component thereof.

2. The solid oxide fuel cell according to claim 1, wherein a particle diameter of the MgO particle is smaller than a particle diameter of the particle made of the perovskite-type composite oxide as the main component thereof.

3. The solid oxide fuel cell according to claim 1, wherein the MgO particle is included in the solid electrolyte layer at a rate larger than 0 vol % and equal to or smaller than 20 vol %.

4. The solid oxide fuel cell according to claim 1, wherein the MgO particle and is unevenly distributed at the first side of the solid electrolyte layer.

5. The solid oxide fuel cell according to claim 1, wherein at an interface between the fuel electrode and the solid electrolyte layer, a volume ratio of the particles made of the perovskite-type composite oxide as the main component thereof to the MgO particles is 80:20 to 20:80.

6. The solid oxide fuel cell according to claim 1, comprising an intermediate layer made of a cerium oxide that includes La, between the solid electrolyte layer and the fuel electrode.

* * * * *